United States Patent
Frederiksen et al.

(10) Patent No.: US 11,525,905 B2
(45) Date of Patent: Dec. 13, 2022

(54) LIDAR DEVICE FOR DETECTING AN OBJECT

(71) Applicant: Robert Bosch GmbH, Stuttgart (DE)

(72) Inventors: Annette Frederiksen, Renningen (DE); Stefanie Hartmann, Rottenburg Am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 768 days.

(21) Appl. No.: 16/525,827

(22) Filed: Jul. 30, 2019

(65) Prior Publication Data

US 2020/0041625 A1 Feb. 6, 2020

(30) Foreign Application Priority Data

Aug. 1, 2018 (DE) .......................... 102018212823.5

(51) Int. Cl.
*G01S 7/497* (2006.01)
*G01S 7/484* (2006.01)
*G01S 7/481* (2006.01)

(52) U.S. Cl.
CPC .............. *G01S 7/497* (2013.01); *G01S 7/484* (2013.01); *G01S 7/4817* (2013.01)

(58) Field of Classification Search
CPC ...... G01S 7/4813; G01S 7/4817; G01S 7/484; G01S 7/497; G01S 17/42

USPC ........................................................ 702/159
See application file for complete search history.

(56) References Cited

U.S. PATENT DOCUMENTS 10,845,482 B2 * 11/2020 Frederiksen ............ G01S 17/08
2011/0286009 A1 11/2011 Lohmann

FOREIGN PATENT DOCUMENTS

DE 102016220468 A1 4/2018
DE 102017218587 A1 4/2019

* cited by examiner

*Primary Examiner* — John H Le
(74) *Attorney, Agent, or Firm* — Norton Rose Fulbright US LLP; Gerard Messina

(57) ABSTRACT

A LIDAR device for detecting an object in the surroundings, including at least one transmitter for emitting electromagnetic radiation into the surroundings; at least one rotating deflection unit for deflecting the emitted electromagnetic radiation; at least one detection lens system for receiving electromagnetic radiation which has been reflected by the object in the surroundings, and for directing the received electromagnetic radiation at a first detector unit; at least one second detector unit; and at least one diffractive optical element. The at least one diffractive optical element includes at least one first diffraction area and at least one second diffraction area, an at least first diffraction efficiency assigned to the at least first diffraction area being different from an at least second diffraction efficiency assigned to the at least second diffraction area.

14 Claims, 6 Drawing Sheets

LIDAR DEVICE FOR DETECTING AN OBJECT

CROSS REFERENCE

The present application claims the benefit under 35 U.S.C. § 119 of German Patent Application No. DE 102018212823.5 filed on Aug. 1, 2018, which is expressly incorporated herein by reference in its entirety.

FIELD

The present invention relates to a LIDAR device for detecting an object in the surroundings and to a method for activating a LIDAR device.

BACKGROUND INFORMATION

German Patent Application No. DE 10 2016 220 468 A1 describes a LIDAR sensor for detecting an object in the surroundings, the LIDAR sensor including at least one transmitting unit for emitting electromagnetic radiation, at least one receiving unit for receiving electromagnetic radiation which has been reflected by the object, at least one refractive element, which is at least partially pervious to the electromagnetic radiation, and a rotating unit, which includes at least the at least one refractive element, the at least one transmitting unit and the at least one receiving unit. The at least one refractive element includes at least one optical lens and a beam splitter for splitting the electromagnetic radiation. The beam splitter may be formed by a holographic optical element. With holographic optical elements, a splitting of electromagnetic radiation and a radiation deflection of the one portion of the electromagnetic radiation is achieved by diffraction on a grating.

SUMMARY

The present invention is directed to a LIDAR device for detecting an object in the surroundings. The LIDAR device includes at least one transmitter for emitting electromagnetic radiation into the surroundings; at least one rotating deflection unit for deflecting the emitted electromagnetic radiation; at least one detection lens system for receiving electromagnetic radiation, which was reflected by the object in the surroundings, and for directing the received electromagnetic radiation at a first detector unit; at least one second detector unit; and at least one diffractive optical element.

According to the present invention, the at least one diffractive optical element includes at least one first diffraction area and at least one second diffraction area, an at least first diffraction efficiency assigned to the at least first diffraction area being different from an at least second diffraction efficiency assigned to the at least second diffraction area.

Preferably, a diffraction grating is used as the diffractive optical element. A diffractive optical element may be an imaging diffractive optical element. A diffractive optical element may be a holographic optical element.

The transmitter may be designed as a laser, in particular as a laser diode. The emitted electromagnetic radiation may be laser light. The transmitter may be designed as a light emitting diode (LED). The transmitter may be designed as an organic light emitting diode (OLED). The emitted electromagnetic radiation may have a predefined wavelength. The transmitter may also include at least two lasers, the at least two lasers being able to emit the electromagnetic radiation in the form of a laser line. The at least two lasers may be activated sequentially.

The detection lens system may be designed as a lens in the reception beam path. The detection lens system may include one or multiple optical lens(es). The first detector unit may include at least one detection unit.

A detection unit of the first detector unit may be designed as a photodiode. A detection unit of the second detector unit may be designed as a photodiode.

The rotating deflection unit may include a rotor. The rotating deflection unit may furthermore include static elements. The rotating deflection unit may include a stator. The transmitter of the LIDAR device may be situated on the rotor. The at least one detection lens system may be situated on the rotor. The one first detector unit may be situated on the rotor. The at least one second detector unit may be situated on the rotor. The at least one diffractive optical element may be situated on a static element.

An advantage of the present invention is that, with the aid of the described LIDAR device, at least one property of at least one component of the LIDAR device is efficiently ascertained. The installation space of the LIDAR device may be kept small in the process. The diffractive optical element may be composed of foil material. The diffractive optical element takes up little installation space and is flexible in its arrangement inside the LIDAR device. This results in greater freedom in the spatial arrangement of the diffractive optical element inside the LIDAR device. This results in greater freedom in the spatial arrangement of the at least one first diffraction area and of the at least one second diffraction area inside the LIDAR device.

In one advantageous embodiment of the present invention, it is provided that the at least first diffraction area is designed to divert and/or focus at least one first predefined portion of the emitted electromagnetic radiation to and/or on the second detector unit; and that the at least second diffraction area is designed to divert and/or focus at least one second predefined portion of the emitted electromagnetic radiation to and/or on the second detector unit.

The at least one first predefined portion in this case is, in particular, a function of the at least first diffraction efficiency. The at least second predefined portion is, in particular, a function of the at least second diffraction efficiency. The at least first diffraction area is, in particular, designed to divert the at least one first predefined portion to the second detector unit and/or to focus it with the aid of at least one first predefined diversion angle. The at least one first predefined diversion angle in this case is, in particular, a function of the orientation of the grating planes of the at least first diffraction area. In particular, the distance of the grating planes of the grating in a volume hologram is designed in such a way that it matches the wavelength of the emitted electromagnetic radiation. The at least second diffraction area is, in particular, designed to divert the at least one second predefined portion to the second detector unit with the aid of at least one second predefined diversion angle and/or to focus it. The at least one second predefined diversion angle in this case is a function, in particular, of the orientation of the grating planes of the at least second diffraction area. In particular, the distance of the grating planes of the grating in a volume hologram is designed in such a way that it matches the wavelength of the emitted electromagnetic radiation. The at least one first predefined diversion angle and the at least one second predefined diversion angle may have the same value. The at least one first predefined diversion angle and the at least one second predefined diversion angle may have different values.

An advantage of this embodiment is that the diffractive optical element is not subject to the limitations of the law of reflection. An optical function of the at least first diffraction area, for example, an angle by which incident light having a predefined wavelength is diverted, may be freely selected in the creation of the at least first diffraction area. An optical function of the at least second diffraction area, for example, an angle by which incident light having a predefined wavelength is diverted, may be freely selected in the creation of the at least second diffraction area. Additional optical functions such as, for example, a beam-focusing function, may be stored in a cost-effective and space-saving manner in the at least first diffraction area. Additional optical functions such as, for example, a beam-focusing function, may be stored in a cost-effective and space-saving manner in the at least second diffraction area.

In another advantageous embodiment of the present invention, it is provided that the at least one second detector unit is designed to detect the at least one first predefined portion of the emitted electromagnetic radiation as at least one first signal, and to detect the at least one second predefined portion of the emitted electromagnetic radiation as at least one second signal, and, based on the chronological progression of the at least one first signal and of the at least one second signal, to ascertain at least one property of at least one component of the LIDAR device. The signals detected by the second detector unit in this case are, in particular, a function of an angular velocity of the rotating deflection unit, and the size, the diffraction efficiency and/or the sequence of the first and second diffraction areas. The at least one first signal and the at least one second signal are, in particular, periodically and/or aperiodically modulated.

An advantage of this embodiment is that at least one property of at least one component of the LIDAR device may be efficiently ascertained. This increases the safety of the LIDAR device. It is possible to efficiently ascertain at least one time-dependent property of at least one component of the LIDAR device. It is possible to efficiently ascertain a property of at least one component of the LIDAR device that is variable over a time.

In another advantageous embodiment of the present invention, it is provided that the at least one component is the rotating deflection unit, and that the property to be ascertained is an angular velocity of the rotating deflection unit.

An advantage of this embodiment is that an efficient ascertainment of a property of the rotating deflection unit is made possible. The ascertainment of the property of the rotating deflection unit in this case is possible without an additional light source on the rotor of the rotating deflection unit. Furthermore, it is not necessary to transmit a measured angular velocity from the stator to the rotor of the rotating deflection unit. A separate ascertainment of the angular velocity for the rotor is made possible. An efficient ascertainment of the angular velocity of the rotating deflection unit is made possible. In this way, a better activation of the transmitter is made possible. In this way, a better activation of the emitted electromagnetic radiation is made possible. The transmitter may be activated in such a way that it emits electromagnetic radiation at the correct angular distances. Furthermore, a malfunction of the rotating deflection unit may be identified quickly and with great reliability. In the event of a malfunction, the LIDAR device may be switched off quickly. In the event of a malfunction, the transmitter of the LIDAR device may be switched off quickly. This is important, in particular, to ensure eye safety when using the LIDAR device. This is, in particular, of great importance when using the LIDAR device in the automotive field. By calibrating the at least one diffractive optical element and the second detector unit, a reliable functional check of the rotating deflection unit may be made possible. By calibrating the at least one first diffraction area and the rotating deflection unit, a reliable functional check of the transmitter may be made possible. By calibrating the at least one second diffraction area and the rotating deflection unit, a reliable functional check of the transmitter may be made possible. This increases the safety of the LIDAR device.

In another advantageous embodiment of the present invention, it is provided that the at least one component is the transmitter, and that the at least one property to be ascertained is a power, a pulse length and/or a wavelength of the emitted electromagnetic radiation.

The advantage of this embodiment is that an efficient ascertainment of a property of the transmitter is made possible.

An efficient functional check of the transmitter is made possible. The functional check may be a power check, an energy check, a pulse length check and/or a wavelength check. An efficient power check may be made possible. An efficient energy check may be made possible. An efficient pulse length check may be made possible. An efficient wavelength check may be made possible. This enables a calibration of the LIDAR device, whereby a reliable functional check of the transmitter may be made possible. By calibrating the at least one first diffraction area and the second detector unit, a reliable functional check of the transmitter may be made possible. By calibrating the at least one second diffraction area and the second detector unit, a reliable functional check of the transmitter may be made possible. This increases the safety of the LIDAR device. The at least one first signal may be used as a trigger signal of the time-of-flight measurement of the LIDAR device. The at least one second signal may be used as a trigger signal of the time-of-flight measurement of the LIDAR device.

In another advantageous embodiment of the present invention, it is provided that the LIDAR device furthermore includes a control unit, which is designed to activate at least one component of the LIDAR device as a function of the at least one ascertained property. The control unit is, in particular, designed to activate the at least one transmitter of the LIDAR device as a function of the at least one ascertained property. The control unit is, in particular, designed to activate the rotating deflection unit of the LIDAR device as a function of the at least one ascertained property. For this purpose, the control unit may be connected to the second detector unit. For this purpose, the control unit may be connected to the first detector unit. For this purpose, the control unit may be connected to the at least one transmitter. For this purpose, the control unit may be connected to the rotating deflection unit.

An advantage of this embodiment is that it is possible to respond quickly to malfunctions of the LIDAR device. It is possible to quickly compensate for fluctuations in the angular velocity of the rotating deflection unit. It is possible to quickly compensate for fluctuations of the transmitter. In this way, for example, the eye safety of the LIDAR device may be ensured. At least one component of the LIDAR device may also be switched off to ensure safety during the use of the LIDAR device.

For example, the control unit may activate the rotating deflection unit in such a way that a predefined angular velocity is adhered to. For example, the control unit may activate the at least one transmitter in such a way that standards which define limiting values with respect to emitted electromagnetic radiation for laser devices are adhered to. In particular, the eye safety of the LIDAR device may thus be adhered to.

In another advantageous embodiment of the present invention, it is provided that the LIDAR device furthermore includes a housing, the at least one diffractive optical element being situated on the housing. The housing may be a static element of the LIDAR device. The diffractive element in this case may be situated on an inner side of the housing. The diffractive optical element may also be situated on an outer side of the housing. In this case, additional precautions are necessary to ensure the scratch resistance of the diffractive optical element, and to protect the diffractive optical element from dirt. As an alternative, the diffractive optical element is situated in the housing. The diffractive optical element may be embedded in a housing assembly for this purpose. If a LIDAR device includes at least two diffractive optical elements, these may be situated in a different manner on and/or in the housing. The housing may be at least partially made up of glass and/or of another material transparent to the emitted and received electromagnetic radiation.

An advantage of this embodiment is that the arrangement of the diffractive optical element on the housing is very flexible. This results in a variety of arrangement options. These arrangements may be specifically adapted to the requirements of the ascertainment of at least one property of at least one component of the LIDAR device.

In another advantageous embodiment of the present invention, it is provided that an angular range used for a field of vision of the LIDAR device and an angular range not used for the field of vision of the LIDAR device are formed, and that the at least one diffractive optical element is situated in the unused angular range.

An advantage of this embodiment is that an angular range of the housing, which is not used for the field of vision of the LIDAR device, may be used for the ascertainment of at least one property of at least one component of the LIDAR device. This area of the housing may be non-transparent.

In another advantageous embodiment of the present invention, it is provided that the at least one diffraction area and/or the at least one second diffraction area of the at least one diffractive optical element situated in the unused angular range is designed as a reflection hologram.

An advantage of this embodiment is that a reflection hologram may be used with greater efficiency. Accordingly, electromagnetic radiation may be emitted at a lower intensity into the unused angular range. Only the required amount of electromagnetic radiation has to be emitted into the unused angular range. The ascertainment of at least one property of at least one component of the LIDAR device in the unused angular range may be used, in particular, even after a malfunction for switching the LIDAR device back on. For this purpose, for example, initially the wavelength of the emitted electromagnetic radiation, the power of the emitted electromagnetic radiation, the angular rotation velocity and/or the function of the second detector unit may be checked, without electromagnetic radiation leaving the LIDAR device.

In another advantageous embodiment of the present invention, it is provided that the diffractive optical element is designed as a holographic optical element, in particular, as a volume hologram, as an amplitude hologram and/or as a phase hologram.

An advantage of this embodiment is that such a diffractive optical element has an angle and wavelength selectivity. This angle and wavelength selectivity is, in particular, achieved by a volume modulation. The at least one first diffraction area in this case may have an angle selectivity different from the at least one second diffraction area. The at least one first diffraction area in this case may have an angle selectivity similar to the at least one second diffraction area. The at least one first diffraction area in this case may have a wavelength selectivity different from the at least one second diffraction area. The at least one first diffraction area in this case may have a wavelength selectivity similar to the at least one second diffraction area. The diffractive optical element may be manufactured by printing methods. The diffractive optical element may be composed of thin foil material. The diffractive optical element may be individually adapted to the LIDAR device. In particular, the optical properties of the diffractive optical element may be individually adapted to the LIDAR device. For example, the diffraction efficiency of the at least one first diffraction area may be set during the manufacture in such a way that the at least one first predefined portion of the emitted electromagnetic radiation is as large as is necessary to carry out a meaningful functional check, but as small as is necessary to keep an energy loss in the transmission beam path low. For example, the diffraction efficiency of the at least one second diffraction area may be set during the manufacture in such a way that the at least one second predefined portion of the emitted electromagnetic radiation is as large as is necessary to carry out a meaningful functional check, but as small as is necessary to keep an energy loss in the transmission beam path low.

The present invention is furthermore directed to a method for activating a LIDAR device, including the steps: emitting electromagnetic radiation into the surroundings with the aid of at least one transmitter; deflecting the emitted electromagnetic radiation with the aid of a rotating deflection unit; receiving electromagnetic radiation, which has been reflected by the object in the surroundings, with the aid of at least one detection lens system; and directing the received electromagnetic radiation at a first detector unit.

According to the present invention, the method includes the further step: diverting and/or focusing at least one first predefined portion of the emitted electromagnetic radiation to and/or on a second detector unit with the aid of at least one first diffraction area of a diffractive optical element, and diverting and/or focusing at least one second predefined portion of the emitted electromagnetic radiation to and/or on the second detector unit with the aid of at least one second diffraction area of the diffractive optical element, an at least first diffraction efficiency assigned to the at least first diffraction area being different from an at least second diffraction efficiency assigned to the at least second diffraction area.

BRIEF DESCRIPTION OF THE DRAWINGS

Exemplary embodiments of the present invention are described in greater detail hereafter based on the figures. Identical reference numerals in the figures indicate identical or identically operating elements.

DETAILED DESCRIPTION OF EXAMPLE EMBODIMENTS

Figure 1:
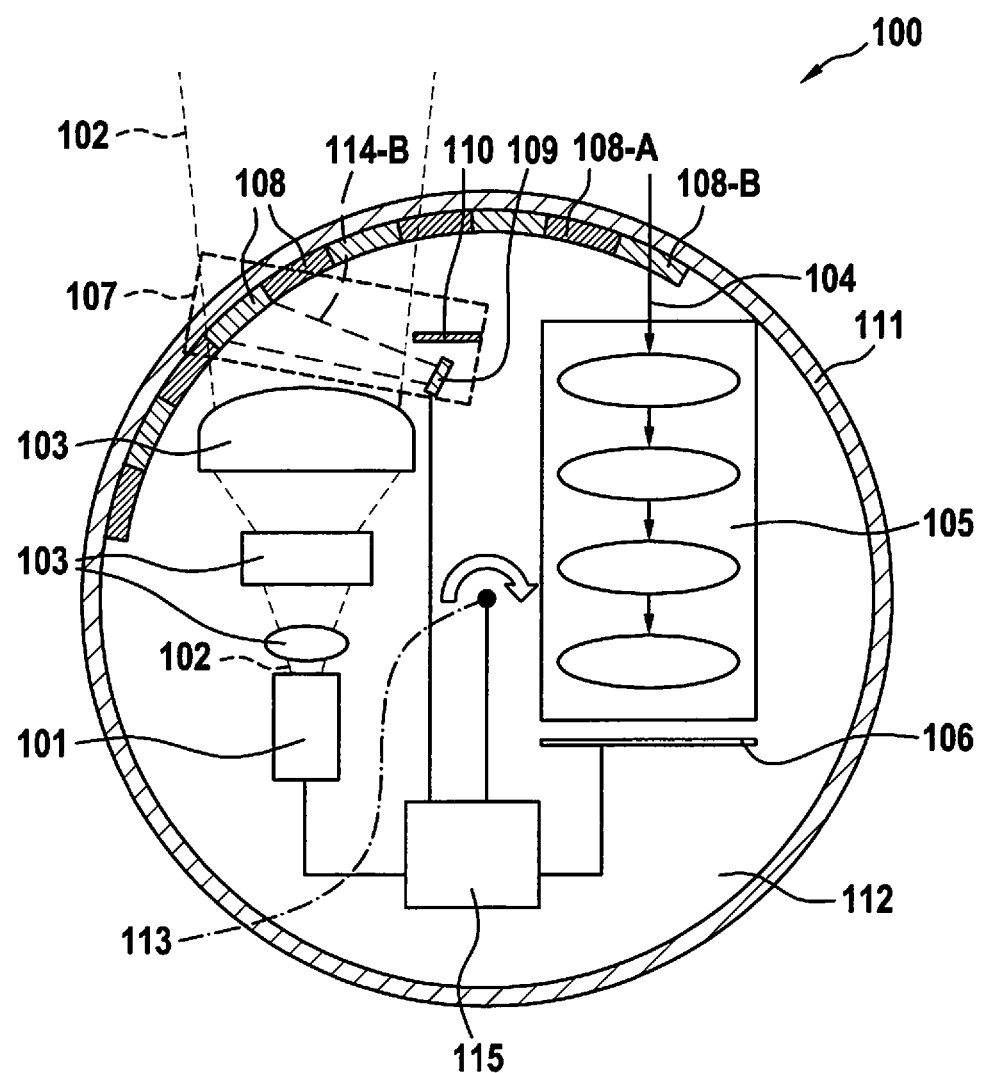
FIG. 1 shows a first example of a LIDAR device.
Figure 2:
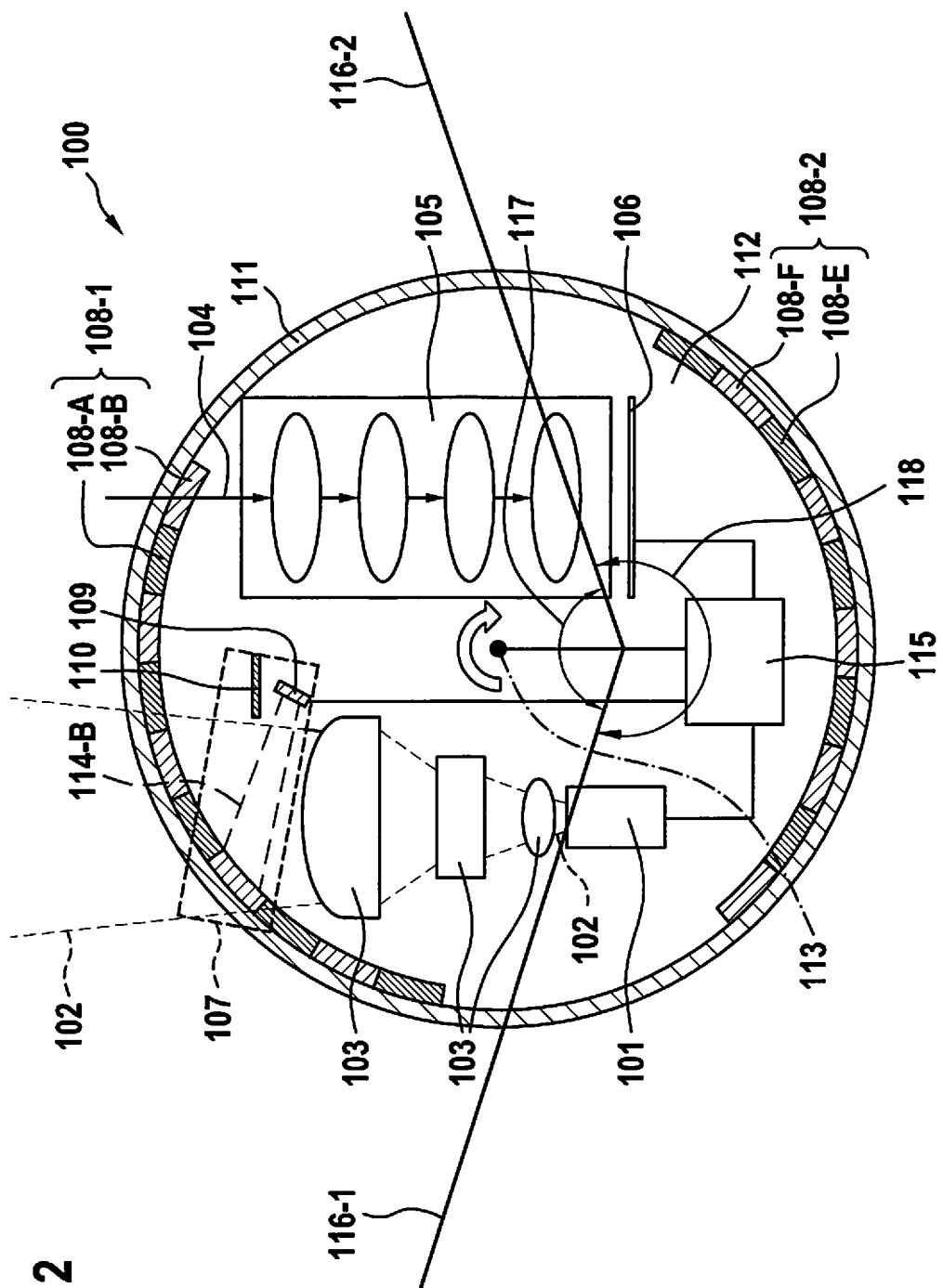
FIG. 2 shows a second example of a LIDAR device.

FIGS. 1 and 2, by way of example, show two specific embodiments of LIDAR device 100. In each of the two shown specific embodiments, LIDAR device 100 includes a rotating deflection unit 112, which is designed to be rotatable about a rotary axis 113. All components of LIDAR device 100 may be situated on this rotating deflection unit 112. In another specific embodiment, which is not shown here, rotating deflection unit 112 may also be rotatable, it being possible for further components of LIDAR device 100 to be situated in a stationary manner. In the specific embodiments shown in FIGS. 1 and 2, LIDAR device 100 in each case includes a housing 111.

LIDAR device 100 (see FIGS. 1 and 2) includes a transmitter 101. Transmitter 101 emits electromagnetic radiation 102, which is shaped with the aid of a transmission lens system 103. Transmission lens system 103 may include at least one optical lens and/or at least one optical filter. After the beam has been shaped, electromagnetic radiation 102 is emitted into the surroundings of LIDAR device 100. In the surroundings, emitted electromagnetic radiation 102 may be reflected by an object. Thereafter, the reflected electromagnetic radiation may be received by a detection lens system 105 of LIDAR device 100. Received electromagnetic radiation 104 is directed at a first detector unit 106 with the aid of detection lens system 105. Detection lens system 105 may include at least one optical lens and/or at least one optical filter. Detection lens system 105 may be designed as a lens in the reception beam path, as is shown in FIGS. 1 and 2. First detector unit 106 may include at least one detection unit. A detection unit may be designed as a photodiode.

Each of the specific embodiments of LIDAR device 100 shown in FIGS. 1 and 2 includes at least one unit 107 for ascertaining at least one property of at least one component of LIDAR device 100. In FIG. 1, unit 107 includes diffractive optical element 108 and a second detector unit 109. Diffractive optical element 108 is largely transparent to emitted electromagnetic radiation 102. In FIG. 2, LIDAR device 100 includes diffractive optical element 108-1 in an angular range 117 used for a field of vision of LIDAR device 100. Diffractive optical element 108-1 is largely transparent to emitted electromagnetic radiation 102. Diffractive optical element 108-1 may be designed as a reflection hologram. In a first rotational position of rotating deflection unit 112 shown in FIG. 2, unit 107 is formed by diffractive optical element 108-1 and a second detector unit 109. In FIG. 2, LIDAR device 100 additionally includes diffractive optical element 108-2 in an angular range 118 not used for a field of vision of LIDAR device 100. Diffractive optical element 108-2 may be largely transparent to emitted electromagnetic radiation 102. Diffractive optical element 108-2 may be designed as a reflection hologram. In a second rotational position of rotating deflection unit 112, which is not shown here, unit 107 is formed by diffractive optical element 108-2 and second detector unit 109. The distinction between used angular range 117 and unused angular range 118 is illustrated with the aid of lines 116-1 and 116-2. Diffractive optical elements 108, 108-1, 108-2 may each be designed as a holographic optical element, in particular, as a volume hologram, as an amplitude hologram and/or as a phase hologram.

Diffractive optical element 108 of LIDAR device 100 from FIG. 1 includes multiple first diffraction areas 108-A. Diffractive optical element 108 of LIDAR device 100 from FIG. 1 includes multiple second diffraction areas 108-B. Diffractive optical element 108-1 of LIDAR device 100 from FIG. 2 includes multiple first diffraction areas 108-A. Diffractive optical element 108-1 of LIDAR device 100 from FIG. 2 includes multiple second diffraction areas 108-B. Diffractive optical element 108-2 of LIDAR device 100 from FIG. 2 includes multiple first diffraction areas 108-E. Diffractive optical element 108-1 of LIDAR device 100 from FIG. 2 includes multiple second diffraction areas 108-F. In this case, a first diffraction efficiency assigned to first diffraction area 108-A is different from a second diffraction efficiency assigned to second diffraction area 108-B. In this case, a first diffraction efficiency assigned to first diffraction area 108-E is different from a second diffraction efficiency assigned to second diffraction area 108-F. In FIG. 2, the first diffraction efficiency of first diffraction area 108-A may be different from or equal to first diffraction efficiency of first diffraction area 108-E. In FIG. 2, the second diffraction efficiency of second diffraction area 108-B may be different from or equal to second diffraction efficiency of second diffraction area 108-F. First diffraction area 108-A, 108-E is designed in each case to divert and/or focus at least one first predefined portion 114-A, 114-E (neither one is shown here) of emitted electromagnetic radiation 102 to and/or on second detector unit 109. Second diffraction area 108-B, 108-F is designed in each case to divert and/or focus a second predefined portion 114-B (shown here), 114-F (not shown here) of emitted electromagnetic radiation 102 to and/or on second detector unit 109. For this purpose, each diffraction area 108-A, 108-B, 108-E, 108-F may include a diffraction grating on which the respective predefined portion 114-A, 114-B, 114-E, 114-F is diffracted.

Second detector unit 109 may detect the at least one first predefined portion 114-A or 114-E of emitted electromagnetic radiation 102 as at least one first signal 403-A or 403-E.

Second detector unit 109 may detect the at least one second predefined portion 114-B or 114-F of emitted electromagnetic radiation 102 as at least one second signal 403-E or 403-F. Based on the chronological progression of the at least one first signal 403-A or 403-E and of the at least one second signal 403-B or 403-F, second detector unit 109 may ascertain at least one property of at least one component of LIDAR device 100. For this purpose, second detector unit 109 may be connected to a processing unit, which is part of unit 107 for the functional check of transmitter 101. As an alternative, the signals may be transmitted to a processing unit which is part of LIDAR device 100 and which, for example, is additionally designed to process the signals detected by first detector unit 106. The at least one component of LIDAR device 100 may be rotating deflection unit 112, the property to be ascertained being an angular velocity of rotating deflection unit 112. The at least one component of LIDAR device 100 may be transmitter 101, the at least one property to be ascertained being a power, an energy, a pulse length and/or a wavelength of emitted electromagnetic radiation 102.

Diffractive optical elements 108, 108-1 and 108-2 shown in FIGS. 1 and 2 each also have a beam-focusing effect, in addition to the diverting effect. Predefined first portion 114-A or 114-E is thus diverted to second detector unit 109 and focused with the aid of first diffraction area 108-A or 108-E. Predefined second portion 114-B or 114-F is thus diverted to second detector unit 109 and focused with the aid of second diffraction area 108-B or 108-F. Thus, no additional lens system is necessary in the examples shown in FIGS. 1 and 2. In cases in which the diffractive optical elements would not have a beam-focusing effect or this effect is not sufficient, an additional lens system may implement this function.

Second detector unit 109 shown in FIGS. 1 and 2 is designed as a detection unit, in particular a photodiode. Due to the beam-focusing effect of first diffraction areas 108-A and 108-E and of second diffraction areas 108-B and 108-F, a small photodiode surface may be used.

As is shown by way of example in FIGS. 1 and 2, unit 107 for the functional check may furthermore include at least one blocking element 110 for shielding second detector unit 109 against secondary radiation. In this way, it is possible to prevent sunlight, for example, from impairing the functional check. In addition or as an alternative, interfering secondary radiation may be reduced with the aid of an optical filter, which is situated on housing 111. In addition or as an alternative, interfering non-pulsed secondary radiation may be subtracted from the signals of the pulsed, received electromagnetic radiation.

As is shown in FIGS. 1 and 2, LIDAR device 100 furthermore includes a control unit 115. Control unit 115 is connected to transmitter 101, first detector unit 106, second detector unit 109 and rotating deflection unit 112 (illustrated in FIG. 1 and by the connection to rotary axis 113). It is designed to activate at least one component of LIDAR device 100 as a function of at least one ascertained property. Control unit 115 may be designed to activate rotating deflection unit 112 as a function of the ascertained angular velocity. Control unit 115 may be designed to activate the at least one transmitter 101 as a function of the ascertained property. Control unit 115 may be designed to activate the at least one transmitter 101 as a function of the ascertained power, energy, pulse length and/or wavelength of electromagnetic radiation 102 emitted by transmitter 101.

In the specific embodiments shown in FIGS. 1 and 2, diffractive optical elements 108, 108-1, 108-2 are each situated on the inner side of housing 111. First diffraction areas 108-A and 108-E each act in a reflecting manner on first predefined portion 114-A or 114-E of the emitted electromagnetic radiation. Second diffraction areas 108-B and 108-F each act in a reflecting manner on second predefined portion 114-B or 114-F of the emitted electromagnetic radiation. First diffraction areas 108-A and 108-E are each able to divert and/or focus first predefined portion 114-A or 114-E to and/or on second detector unit 109 by at least one first predefined diversion angle. Second diffraction areas 108-B and 108-F are each able to divert and/or focus second predefined portion 114-B or 114-F to and/or on second detector unit 109 by at least one first predefined diversion angle.

FIG. 3, by way of example, shows different options for the arrangement of the at least one first diffraction area 108-A and for the at least one second diffraction area 108-B, 108-C, 108-D on a housing of the LIDAR device. The actually curved housing 111 is shown in a planar manner, "rolled-out" so-to-speak, for better illustration. Housing 111 of LIDAR device 100 extends from −180° to +180°. A respective diffractive optical element 108, including multiple first diffraction areas 108-A and including one or multiple second diffraction area(s) 108-B, 108-C or 108-D, respectively, is situated on housing 111.

Figure 3A:
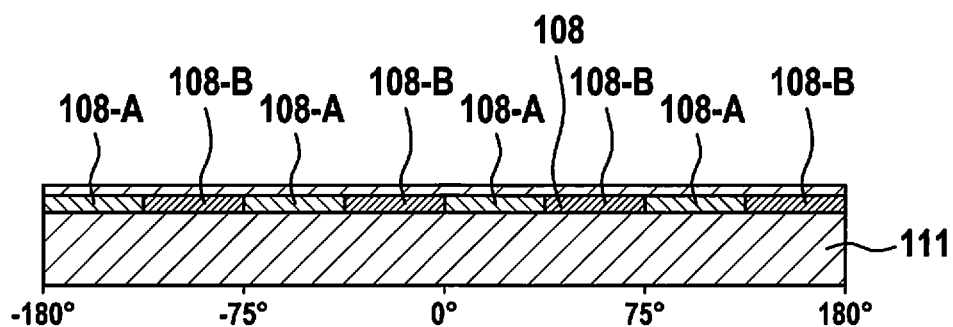
FIGS. 3A through 3D show different options for the arrangement of the at least one first diffraction area and of the at least one second diffraction area on a housing of the LIDAR device.
Figure 3B:
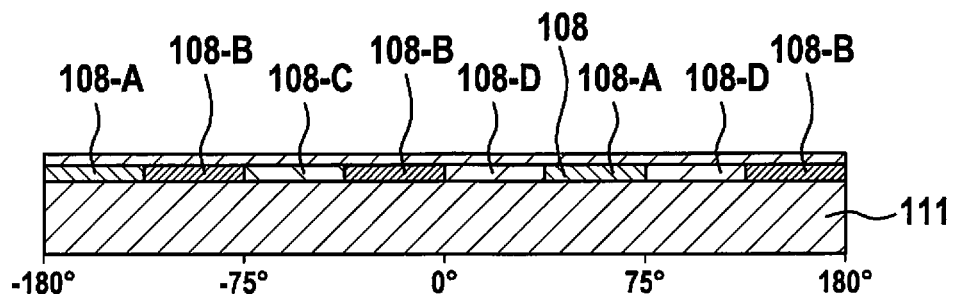

Diffractive optical elements 108 of FIGS. 3A and 3B are each situated in the upper area of housing 111. FIG. 3A shows a periodic sequence of first diffraction areas 108-A, which are each assigned a first diffraction efficiency (e.g., of 1%), and of second diffraction areas 108-B, which are each assigned a second diffraction efficiency (e.g., of 0.5%). This arrangement allows periodically changing signals 403-A and 403-B (see FIG. 4A) to be measured. FIG. 3B shows an aperiodic sequence of multiple diffraction areas. From left to right, a first diffraction area 108-A having a first diffraction efficiency (e.g., of 1%) is followed by a second diffraction area 108-B having a second diffraction efficiency (e.g., of 0.5%), then by a second diffraction area 108-C having a further second diffraction efficiency (e.g., of 2%), then by another second diffraction area 108-B having a second diffraction efficiency (e.g., of 0.5%), then by a second diffraction area 108-D having a further second diffraction efficiency (e.g., of 3%), then again by a first diffraction area 108-A having a first diffraction efficiency (e.g., of 1%), then by another second diffraction area 108-D having a second diffraction efficiency (e.g., of 3%), and then by another second diffraction area 108-B having a second diffraction efficiency (e.g., of 0.5%). This arrangement allows aperiodically changing signals 403-A, 403-B, 403-C and 403-D (not shown) to be measured.

Figure 3C:
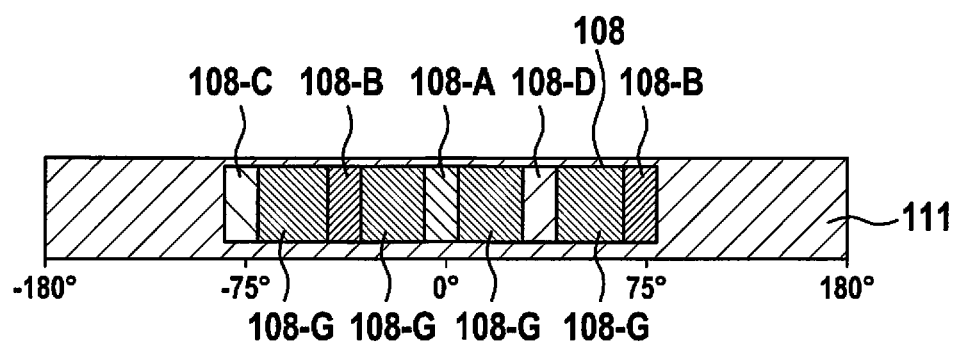

Diffractive optical element 108 of FIG. 3C is centrally situated on the housing. It has an aperiodic sequence of multiple diffraction areas. From left to right, a second diffraction area 108-C having a second diffraction efficiency (e.g., of 2%) is followed by a second diffraction area 108-G having a second diffraction efficiency (e.g., of 0%), by a second diffraction area 108-B having a further second diffraction efficiency (e.g., of 0.5%), by a second diffraction area 108-G having a second diffraction efficiency (e.g., of 0%), then by a first diffraction area 108-A having a first diffraction efficiency (e.g., of 1%), by a second diffraction area 108-G having a second diffraction efficiency (e.g., of 0%), then by a second diffraction area 108-D having a further second diffraction efficiency (e.g., of 3%), by a second diffraction area 108-G having a second diffraction efficiency (e.g., of 0%), and then by another second diffraction area 108-B having a second diffraction efficiency (e.g., of 0.5%). This arrangement allows aperiodically changing signals 403-A, 403-B, 403-C, 403-D and 403-G (not shown) to be measured.

If a diffraction area, such as diffraction areas 108-G in the present example, has a diffraction efficiency of 0%, the associated second predefined portion (in the example here, this would be the respective second predefined portion 114-G) of emitted electromagnetic radiation 102 at second detector unit 109 may have a value of 0. The associated at least one second signal (in the example here, this would be the respective second signal 403-G) may accordingly have a value of 0.

Figure 3D:
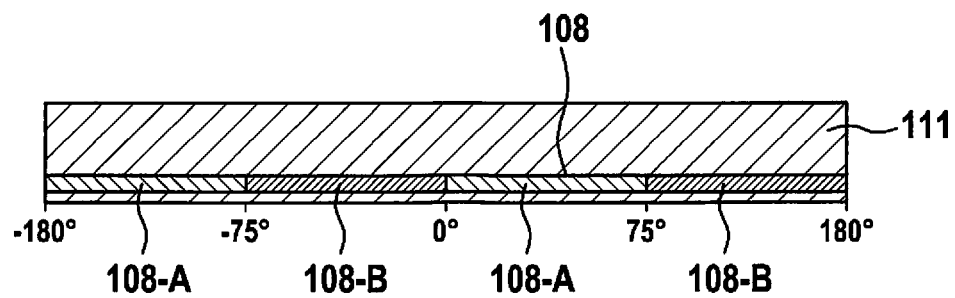

Diffractive optical element 108 of FIG. 3D is situated in the lower area of housing 111. This arrangement may be advantageous when transmitter 101 emits electromagnetic radiation 102 in a column-shaped manner, vertically extended over housing 111. FIG. 3D shows a periodic sequence of first diffraction areas 108-A, which are each assigned a first diffraction efficiency (e.g., of 1%), and of second diffraction areas 108-B, which are each assigned a second diffraction efficiency (e.g., of 0.5%). This arrangement allows periodically changing signals 403-A and 403-B (see FIG. 4A) to be measured.

Figure 4A:
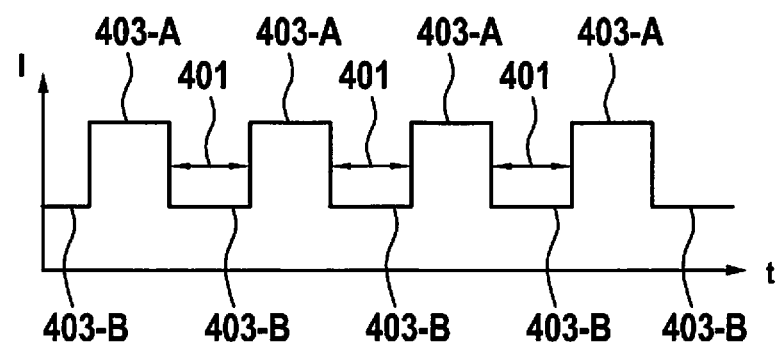
FIGS. 4A through 4C show examples of chronological progressions of an at least first signal and of an at least second signal detected by the second detector unit.
Figure 4B:
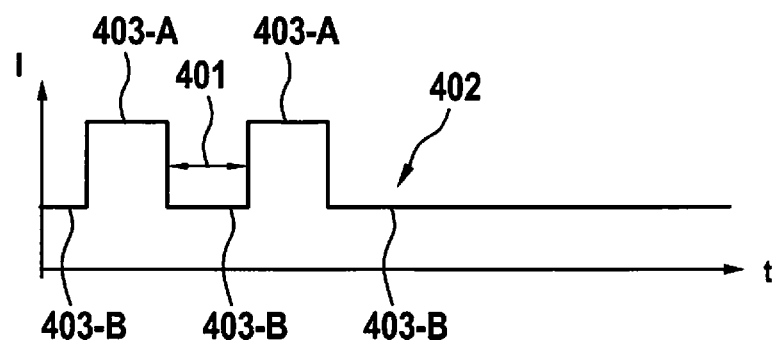
Figure 4C:
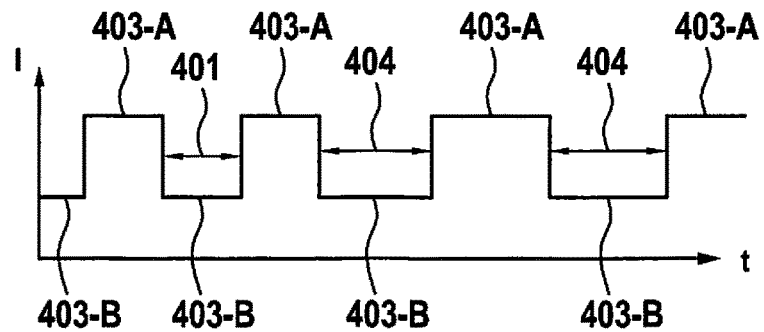

FIGS. 4A through 4C show examples of chronological progressions of an at least first signal 403-A and of an at least second signal 403-B, which are detected by the second detector unit. In each case, the intensity of the signals is plotted against the time. FIG. 4A shows the periodic sequence of signals 403-A and 403-B, which is measurable, e.g., using diffractive optical elements 108 from FIG. 3A or 3D, as long as the associated LIDAR device operates without malfunction. Time intervals 401, e.g., between the end and the start of two first signals 403-A, are always the same here.

FIG. 4B shows the chronological progression of an at least first signal 403-A and of an at least second signal 403-B, e.g., in the event that the rotor of the rotating deflection unit of the LIDAR device comes to a halt. Starting at the point in time marked with 402, only second signal 403-B is still measured. When such a malfunction is detected, individual components or also the entire LIDAR device may be switched off.

FIG. 4C shows the chronological progression of an at least first signal 403-A and of an at least second signal 403-B, e.g., in the event that the angular velocity of the rotating deflection unit of the LIDAR device is slowing. The time intervals, e.g., between the end and the start of two first signals 403-A, increase from 401 to 404. When such a malfunction is detected, e.g., the rotating deflection unit may be activated. For example, the angular velocity may be corrected. In addition or as an alternative, the transmitter may be activated in such a way that, for example, the power of the emitted electromagnetic radiation is changed. As an alternative, individual components or also the entire LIDAR device may be switched off.

Figure 5:
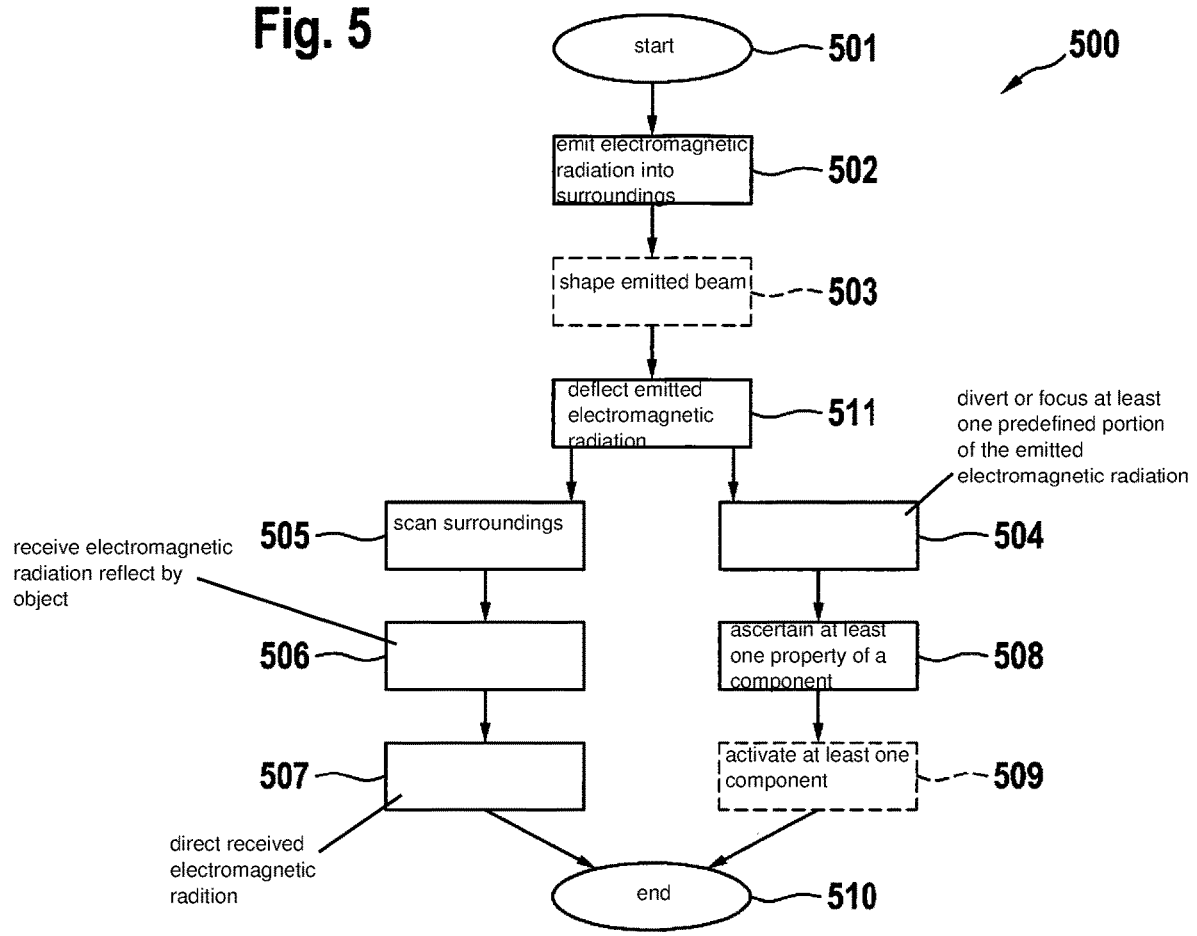
FIG. 5 shows a method for activating a LIDAR device.

FIG. 5 shows a method for activating a LIDAR device. The method starts in step 501. In step 502, electromagnetic radiation is emitted into the surroundings of the LIDAR device with the aid of at least one transmitter. In step 503, the beam of the emitted electromagnetic radiation is shaped with the aid of a transmission lens system. In subsequent step 511, the emitted electromagnetic radiation is deflected with the aid of a rotating deflection unit.

In step 504, at least one first predefined portion of the emitted electromagnetic radiation is diverted to and/or focused on a second detector unit with the aid of at least one first diffraction area of a diffractive optical element, and at least one second predefined portion of the emitted electromagnetic radiation is diverted to and/or focused on the second detector unit with the aid of at least one second diffraction area of the diffractive optical element. In this case, an at least first diffraction efficiency assigned to the at least first diffraction area is different from an at least second diffraction efficiency assigned to the at least second diffraction area. Step 504 is followed by step 508, in which at least one property of at least one component of the LIDAR device is ascertained. In an optional step 509, at least one component of the LIDAR device is activated as a function of the determined property with the aid of a control unit. In parallel with step 504, step 505 also follows step 511. In step 505, the surroundings of the LIDAR device is scanned. In subsequent step 506, electromagnetic radiation, which has been reflected by the object in the surroundings, is received with the aid of at least one detection lens system. In subsequent step 507, the received electromagnetic radiation is directed at a first detector unit.

After steps 507 and 508, or alternatively after steps 507 and 509, the method is ended in step 510.

What is claimed is:

1. A LIDAR device for detecting an object in the surroundings, comprising:
   at least one transmitter configured to emit electromagnetic radiation into the surroundings;
   at least one rotating deflection unit configured to deflect the emitted electromagnetic radiation;
   at least one detection lens system configured to receive electromagnetic radiation, which has been reflected by the object in the surroundings, and to direct the received electromagnetic radiation at a first detector unit;
   at least one second detector unit; and
   at least one diffractive optical element which includes at least one first diffraction area and at least one second diffraction area, an at least first diffraction efficiency assigned to the at least first diffraction area being different from an at least second diffraction efficiency assigned to the at least second diffraction area.

2. The LIDAR device as recited in claim 1, wherein the at least first diffraction area is configured to divert and/or focus at least one first predefined portion of the emitted electromagnetic radiation to and/or on the second detector unit, and the at least second diffraction area is configured to divert and/or focus at least one second predefined portion of the emitted electromagnetic radiation to and/or on the second detector unit.

3. The LIDAR device as recited in claim 2, wherein the at least one second detector unit is configured to detect the at least one first predefined portion of the emitted electromagnetic radiation as at least one first signal, and to detect the at least one second predefined portion of the emitted electromagnetic radiation as at least one second signal, and, based on a chronological progression of the at least one first signal and of the at least one second signal, to ascertain at least one property of at least one component of the LIDAR device.

4. The LIDAR device as recited in claim 3, wherein the at least one component is the rotating deflection unit, and the property to be ascertained is an angular velocity of the rotating deflection unit.

5. The LIDAR device as recited in claim 3, wherein the at least one component is the transmitter, and the at least one property to be ascertained is a power, an energy, a pulse length and/or a wavelength of the emitted electromagnetic radiation.

6. The LIDAR device as recited in claim 3, wherein the LIDAR device furthermore includes a control unit which is configured to activate at least one component of the LIDAR device as a function of the at least one ascertained property.

7. The LIDAR device as recited in claim 1, wherein the LIDAR device furthermore includes a housing, the at least one diffractive optical element being situated on the housing.

8. The LIDAR device as recited in claim 7, wherein an angular range used for a field of vision of the LIDAR device and an angular range not used for the field of vision of the LIDAR device are formed, and the at least one diffractive optical element is situated in the unused angular range.

9. The LIDAR device as recited in claim 8, wherein the at least one first diffraction area and/or the at least one second diffraction area of the at least one diffractive optical element situated in the unused angular range is/are designed as a reflection hologram.

10. The LIDAR device as recited in claim 1, wherein the at least one diffractive optical element includes a first diffractive optical element having the first diffraction efficiency and a second diffractive optical element having the second diffraction efficiency.

11. The LIDAR device as recited in claim 1, wherein the first diffractive optical element and the second diffractive optical element are adjacent to each other.

12. The LIDAR device as recited in claim 11, wherein the at least one rotating deflection unit is configured to shift emitted electromagnetic radiation over time to change to which of the first and second diffractive optical elements the emitted electromagnetic radiation is directed.

13. The LIDAR device as recited in claim 1, wherein the at least one diffractive optical element is configured to direct the electromagnetic radiation from the at least one transmitter to the at least one second detector unit prior to exit of the electromagnetic radiation from the LIDAR device into the surroundings.

14. A method for activating a LIDAR device, comprising the steps:
  emitting electromagnetic radiation into the surroundings using at least one transmitter;
  deflecting the emitted electromagnetic radiation using a rotating deflection unit;
  receiving electromagnetic radiation which has been reflected by an object in the surroundings using at least one detection lens system;
  directing the received electromagnetic radiation at a first detector unit; and
  diverting and/or focusing at least one first predefined portion of the emitted electromagnetic radiation to and/or on a second detector unit using at least one first diffraction area of a diffractive optical element; and
  diverting and/or focusing at least one second predefined portion of the emitted electromagnetic radiation to and/or on the second detector unit using at least one second diffraction area of the diffractive optical element, an at least first diffraction efficiency assigned to the at least first diffraction area being different from an at least second diffraction efficiency assigned to the at least second diffraction area.

* * * * *